(12) United States Patent
Nagai et al.

(10) Patent No.: US 11,261,033 B2
(45) Date of Patent: Mar. 1, 2022

(54) COMBINATION WEIGHING DEVICE

(71) Applicant: Yamato Scale Co., Ltd., Akashi (JP)

(72) Inventors: Takayuki Nagai, Akashi (JP); Ryo Shimizu, Akashi (JP)

(73) Assignee: Yamato Scale Co., Ltd., Hyogo (JP)

( * ) Notice: Subject to any disclaimer, the term of this patent is extended or adjusted under 35 U.S.C. 154(b) by 0 days.

(21) Appl. No.: 17/043,426

(22) PCT Filed: Jun. 27, 2018

(86) PCT No.: PCT/JP2018/024380
§ 371 (c)(1),
(2) Date: Sep. 29, 2020

(87) PCT Pub. No.: WO2020/003410
PCT Pub. Date: Jan. 2, 2020

(65) Prior Publication Data
US 2021/0016976 A1  Jan. 21, 2021

(51) Int. Cl.
| | |
|---|---|
| *B65G 37/00* | (2006.01) |
| *B65G 47/14* | (2006.01) |
| *G01G 19/387* | (2006.01) |

(52) U.S. Cl.
CPC ....... *B65G 47/1421* (2013.01); *G01G 19/387* (2013.01)

(58) Field of Classification Search
CPC ...... B65G 11/02; B65G 24/34; B65G 37/005; B65G 47/1421; B65G 49/05; B65G 2201/0217; B65G 2201/06; B65G 2203/0258; B65G 2812/02; B65G 2818/0344; B65B 37/18; G05B 19/4189; G01G 19/387; G01G 19/393

USPC ........ 198/446, 758, 959; 700/230, 240, 241, 700/242; 177/25.18, 119
See application file for complete search history.

(56) References Cited

U.S. PATENT DOCUMENTS

| | | | |
|---|---|---|---|
| 4,203,269 A | 5/1980 | Petersen | |
| 4,398,612 A * | 8/1983 | Mikami | G01G 19/393 177/25.17 |
| 4,465,150 A * | 8/1984 | Matsumoto | G01G 13/18 177/25.12 |
| 4,467,880 A * | 8/1984 | Minamida | G01G 19/393 177/25.18 |
| 4,629,017 A | 12/1986 | Shroyer | |
| 4,773,527 A * | 9/1988 | Albiol-Catalan | G01G 13/026 177/25.18 |
| 4,809,843 A | 3/1989 | Dietzsch | |

(Continued)

FOREIGN PATENT DOCUMENTS

| | | | |
|---|---|---|---|
| JP | 49-012788 Y2 | 3/1974 | |
| JP | 49-050680 A | 5/1974 | |

(Continued)

*Primary Examiner* — Joseph A Dillon, Jr.
(74) *Attorney, Agent, or Firm* — Norris McLaughlin, P.A.

(57) ABSTRACT

A combination weighing device includes a plurality of weighing units arranged in a circular form, a combination scale configured to temporarily retain, in a collection hopper, articles discharged from one or more of the weighing units selected as a result of combinatorial computations and to discharge the articles from the collection hopper, and an alignment and transport unit configured to align and vibrationally transport the articles discharged from the collection hopper.

6 Claims, 14 Drawing Sheets

(56) References Cited

U.S. PATENT DOCUMENTS

| | | | | |
|---|---|---|---|---|
| 4,858,708 | A * | 8/1989 | Kohno | B29B 7/603 177/25.18 |
| 4,901,807 | A * | 2/1990 | Muskat | G01G 19/393 177/199 |
| 5,050,370 | A | 9/1991 | Stederoth | |
| 5,277,533 | A * | 1/1994 | Caridis | G01G 19/393 177/25.18 |
| 5,330,304 | A * | 7/1994 | Ceridis | G01G 19/393 198/771 |
| 5,773,765 | A * | 6/1998 | Sashiki | B65G 27/08 177/25.18 |
| 5,959,258 | A * | 9/1999 | Howard | G01G 19/393 177/25.18 |
| 6,037,549 | A * | 3/2000 | Weck | G01G 19/393 177/119 |
| 6,119,842 | A * | 9/2000 | Richardson | B65G 47/1407 177/103 |
| 6,262,377 | B1 * | 7/2001 | Nielsen | B65B 1/32 177/1 |
| 6,271,485 | B1 | 8/2001 | Richardson et al. | |
| 6,493,605 | B1 * | 12/2002 | Prideaux | G01G 13/024 177/120 |
| 6,683,261 | B2 * | 1/2004 | Murata | G01G 19/393 177/103 |
| 6,722,506 | B1 * | 4/2004 | Nielsen | G01G 19/387 209/592 |
| 7,368,670 | B2 * | 5/2008 | Hjalmarsson | G01G 19/393 177/119 |
| 7,732,717 | B2 * | 6/2010 | Fujii | G01G 19/393 177/25.18 |
| 7,732,718 | B2 * | 6/2010 | Tatsuoka | G01G 13/026 177/25.18 |
| 7,952,037 | B2 * | 5/2011 | Jacobi | B65B 1/32 177/52 |
| 8,851,269 | B2 * | 10/2014 | Hansen | B65B 57/14 198/563 |
| 10,094,700 | B2 * | 10/2018 | Ikeda | B65G 27/08 |
| 10,723,492 | B2 * | 7/2020 | Kieselhorst | B65B 39/12 |
| 2004/0104054 | A1 * | 6/2004 | Kageyama | G01G 19/393 177/119 |
| 2004/0148056 | A1 * | 7/2004 | Baranowski | G01G 13/24 700/240 |
| 2008/0091299 | A1 * | 4/2008 | Yoshikawa | B65B 51/303 700/242 |
| 2009/0133939 | A1 * | 5/2009 | Taylor | G01G 19/393 177/108 |
| 2009/0277692 | A1 * | 11/2009 | Tatsuoka | G01G 19/393 177/25.18 |
| 2010/0219002 | A1 * | 9/2010 | Nakagawa | B65B 37/18 177/59 |
| 2011/0131930 | A1 * | 6/2011 | Cavalcanti | G01G 19/387 53/473 |
| 2013/0284523 | A1 * | 10/2013 | Takayanagi | G01G 19/387 177/162 |
| 2015/0226600 | A1 * | 8/2015 | Kikuchi | G01G 19/393 177/25.18 |
| 2016/0209263 | A1 * | 7/2016 | Otoshi | G01G 19/393 |
| 2016/0231164 | A1 * | 8/2016 | Debus | G01G 17/02 |
| 2018/0010955 | A1 * | 1/2018 | Kishikawa | G01G 19/393 |
| 2018/0023996 | A1 * | 1/2018 | Ikeda | B65G 65/005 198/572 |
| 2021/0215529 | A1 * | 7/2021 | Takeichi | B65G 65/34 |

FOREIGN PATENT DOCUMENTS

| | | |
|---|---|---|
| JP | 61-217421 A | 9/1986 |
| JP | 7-144745 A | 6/1995 |
| JP | 8-268544 A | 10/1996 |
| JP | H08-271327 A | 10/1996 |
| JP | 9-150937 A | 6/1997 |
| JP | H10-273112 A | 10/1998 |
| JP | 2011-237419 A | 11/2011 |

* cited by examiner

F I G. 8
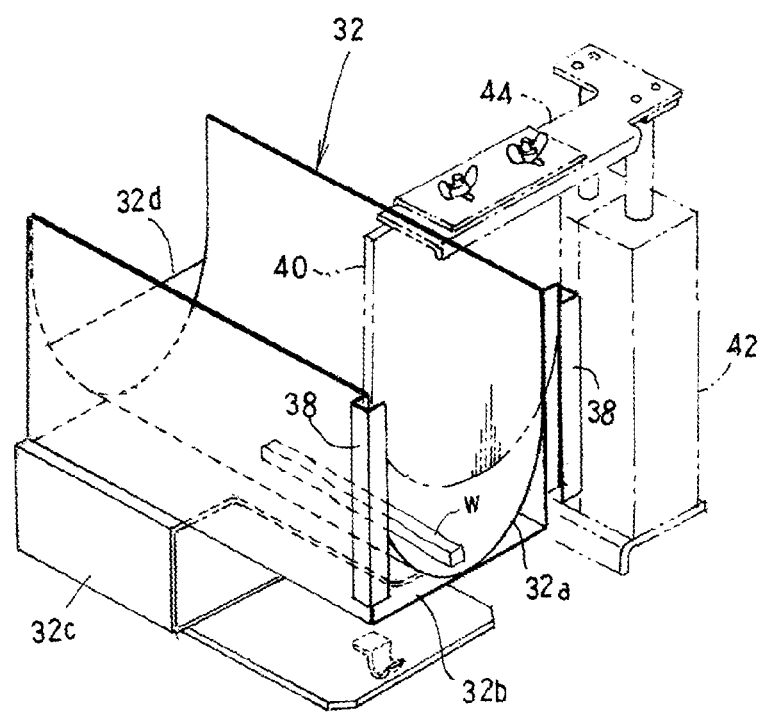

COMBINATION WEIGHING DEVICE

TECHNICAL FIELD

The present invention relates to a combination weighing device, more particularly to a combination weighing device suitable for use in weighing long and thin articles that are relatively soft.

BACKGROUND ART

Patent document 1 describes an example of such combination weighing devices designed to handle long and thin, rod-shaped products. In the weighing device described in this patent document, the rod-shaped articles that have been selected and weighed as a result of combinatorial computations are guided through a collection funnel into a collection chute vertically disposed and having a cylindrical shape tapered downward. Then, the articles received by the collection chute are guided into a rocking guiding cylinder and another guiding cylinder. This weighing device, with these guiding cylinders being mounted thereto, may allow the articles to be retained in a vertical position to prevent the articles from falling and piling up on one another by rocking the rocking guiding cylinder. Then, the articles may be dropped downward without losing their vertical position and then discharged by horizontally opening the shutter plate attached to the bottom of the guiding cylinder.

Patent document 2 describes a weighing device configured to align rod-shaped articles that have been selected and weighed as a result of combinatorial computations. In the weighing device described in this patent document, directions of the weighed rod-shaped articles are changed while the articles are sliding downward along an alignment chute with a throat progressively tapered downward. Thus, the rod-shaped articles may be allowed to lean to a desired extent from their vertical positions and received by the alignment tray, and the received articles may be dropped downward and discharged without losing their current positions by horizontally sliding and opening the gate at the bottom of the alignment tray.

CITATIONS LIST

Patent Document

Patent Document 1: Japanese Unexamined Patent Publication No. 1996-271327
Patent Document 2: Japanese Unexamined Patent Publication No. 1998-273112

SUMMARY OF INVENTION

Technical Problems

The target articles handled by the device described in the patent document 1 are rod-shaped articles that are relatively hard and unlikely to bend or break under certain impacts. This device, however, may be unsuitable for long and thin articles that are relatively soft, examples of which may include strips of jerky meat, and strips of cheese codfish cut out from dried sheets made mostly from minced codfish between which slices of cheese are sandwiched. When such soft, long and thin articles are weighed by the device described in the patent document 1, the articles vertically received and finally falling into the guiding cylinder may often bend or break at the time of impact. In this weighing device, weighed articles of this type may be difficult to align and discharge in an orderly manner.

Such food as cheese codfish, in particular, is often sold in a transparent sealed package to allow consumers to see the contents from outside and is likely to lose or degrade their commercial value if the package contains bent or broken pieces.

The device described in the patent document 2 is also used to handle relatively hard, rod-shaped articles such as breadstick and may be unfit for relatively soft, long and thin articles that need to be orderly aligned and discharged. The strips cheese codfish, for example, are relatively soft, long and thin products that are dampish with large slip resistance. Such products, when used in this device, may be difficult to align and change in direction while they are sliding downward along the alignment chute toward its throat progressively tapered downward.

Under the circumstances, such long, thin and soft products are often manually aligned, weighed and packaged. For example, an operator orderly arranges the articles on a tray, weighs the articles using a platform scale, puts the articles on or in packaging materials, and seals the packaging materials.

To address the issues of the known art, the present invention is directed to providing a combination weighing device allowed to weigh long and thin articles that are relatively soft and to transport the weighed articles out of the device in an orderly manner.

Technical Solutions

To this end, the present invention provides the following technical features.

1) A combination weighing device is provided that includes:
   a plurality of weighing units arranged in a circular form;
   a combination scale configured to temporarily retain, in a collection hopper, articles discharged from one or more of the plurality of weighing units selected as a result of combinatorial computations and to discharge the articles from the collection hopper; and an alignment and transport unit configured to align and vibrationally transport the articles discharged from the collection hopper.

In the combination weighing device according to the present invention, the articles discharged from the collection hopper of the combination scale are vibrationally transported and thereby aligned by the alignment and transport unit. Thus, long and thin products that are relatively soft, such as jerky meat and cheese codfish, may be successfully aligned without being accidentally bent or broken and then transported out of the device to a subsequent packaging process.

2) In a preferred embodiment of the present invention, the alignment and transport unit includes a collection trough that receives the articles discharged from the collection hopper; and a vibration generator configured to vibrate the collection trough and to vibrationally transport the articles in a longitudinal direction of the collection trough. The collection trough has a bottom part formed in a dented and curved shape.

In the combination weighing device according to this embodiment of the present invention, long and thin articles may be vibrationally transported and piled up on one another along the dented and curved bottom part of the collection trough, and the articles may be smoothly aligned, with their longitudinal directions being coincident with the longitudinal direction of the collection trough.

3) In another embodiment of the present invention, the collection trough has a U-like shape in cross section.

In the combination weighing device according to this embodiment of the present invention, the articles thrown into the collection trough may be vibrationally transported and then collected along the U-shaped cross section of the collection trough, and the articles may be smoothly aligned, with their longitudinal directions being coincident with the longitudinal direction of the collection trough.

4) In one embodiment of the present invention, the alignment and transport unit has a plurality of the collection troughs disposed along a direction of transport of the articles; and a plurality of shutters disposed at ends of the plurality of the collection troughs in the direction of transport and allowed to open and close transport paths of the plurality of the collection troughs.

In the combination weighing device according to this embodiment of the present invention, the articles vibrationally transported by the collection troughs are received by the shutters disposed at ends of the collection troughs and may be successfully aligned, with their tips being lined up with one another. Further advantageously, the articles may be aligned in stages by each of the collection troughs. As a result, the articles discharged from a most downstream one of the collection troughs in the direction of transport may be equally adjusted in direction, with their tips being lined up with one another.

5) In yet another embodiment of the present invention, the alignment and transport unit includes a pusher used to push and discharge the articles out of a most downstream one of the plurality of the collection troughs in the direction of transport.

In the combination weighing device according to this embodiment of the present invention, the articles discharged from the most downstream collection trough of the alignment and transport unit in the direction of transport are pushed by the pusher and discharged at once. Thus, the articles may be discharged in shorter time than being discharged through vibration alone. This may enable more efficient discharge of the articles, allowing the articles to be discharged, with their tips being lined up with one another.

6) In yet another embodiment of the present invention, the combination weighing device further includes: a sorting unit disposed between the combination scale and the alignment and transport unit and configured to sort the articles discharged from the collection hopper of the combination scale into a plurality of target places; and a plurality of the alignment and transport units disposed correspondingly to the plurality of target places that receive the articles sorted and discharged by the sorting unit.

In the combination weighing device according to this embodiment of the present invention, the articles discharged from the collection hopper of the combination scale are sorted by the sorting unit into the alignment and transport units disposed at a plurality of positions and then aligned and transported by these different alignment and transport units. This structural feature may allow the combination scale to operate at higher speeds, enabling a higher efficiency of the weighing process, than the articles being aligned and transported by one alignment and transport unit alone.

Higher transport speeds may be difficult to achieve in the combination weighing device that uses the alignment and transport unit for alignment and transport of the articles. Use of two or more alignment and transport units, however, may allow the articles to be vibrationally transported at optimal speeds in different transport paths of the respective alignment and transport units, enabling the combination scale to perform a faster weighing process. As a result, productivity of the combination weighing device may be successfully improved.

7) In yet another embodiment of the present invention, the collection hopper of the combination scale is allowed to selectively discharge the articles to two different discharge paths, the sorting unit includes: two sorting chutes that respectively guide the articles on the two different discharge paths to flow downward; and two sorting hoppers allowed to temporarily retain the articles guided by the sorting chutes and to selectively discharge the articles to two different discharge paths, and the plurality of the alignment and transport units independently operate correspondingly to the two different discharge paths of the two sorting hoppers.

In the combination weighing device according to this embodiment of the present invention, the articles discharged from the collection hopper of the combination scale are sorted by the sorting unit into four alignment and transport units in total and then aligned and transported by these four alignment and transport units. This structural feature may allow the articles to be weighed, aligned and transported more efficiently than the articles being aligned and transported by one alignment and transport unit alone.

Effects of the Invention

The combination weighing device according to the present invention may successfully align long and thin articles that are relatively soft in an orderly manner and transports the aligned articles out of the device.

BRIEF DESCRIPTION OF THE DRAWINGS

FIG. 8 is a perspective view of a middle collection trough of the alignment and transport unit.

DESCRIPTION OF EMBODIMENTS

Embodiments of the present invention are hereinafter described in detail withe reference to the accompanying drawings.

Figure 1:
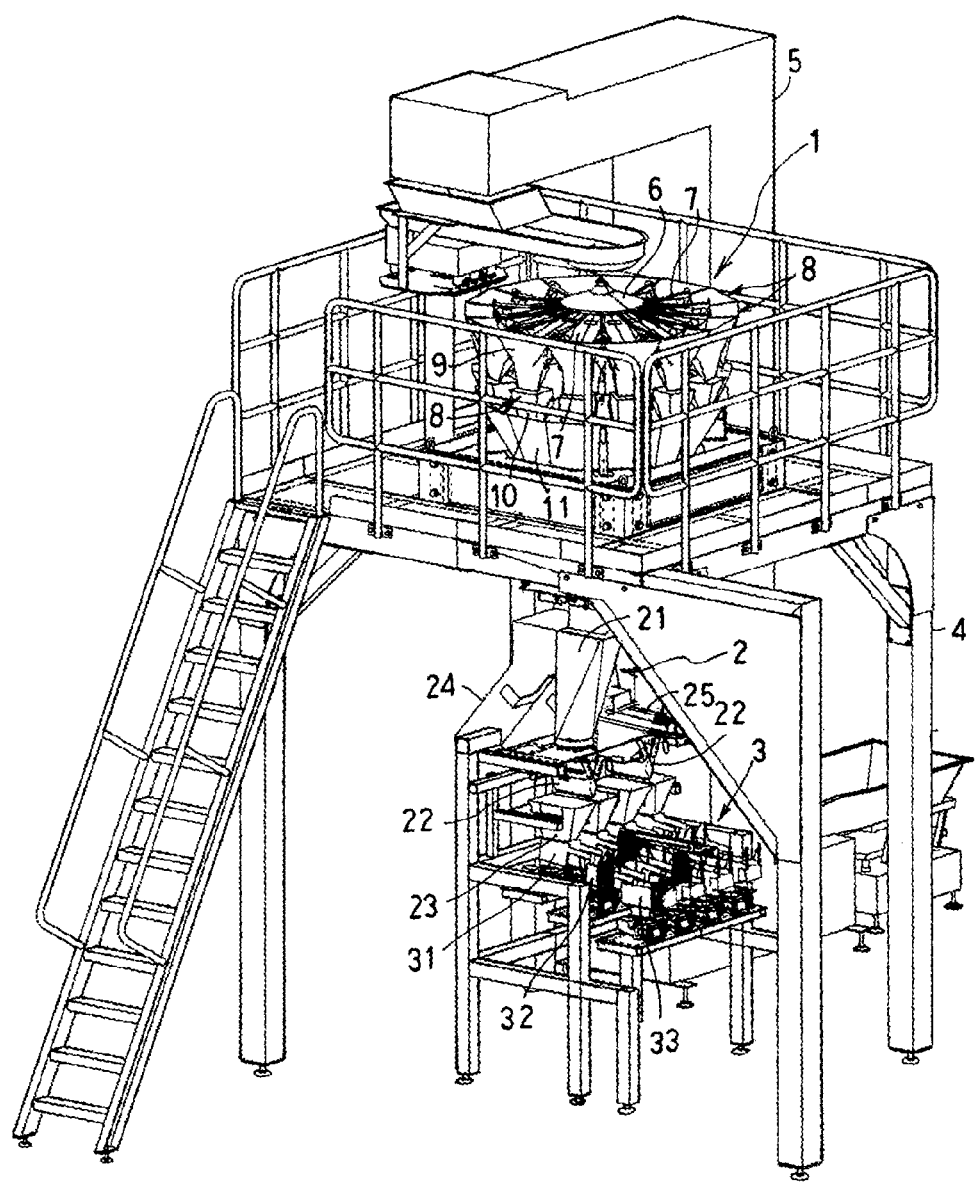
FIG. 1 is a perspective view of a combination weighing device according to an embodiment of the present invention.
Figure 2:
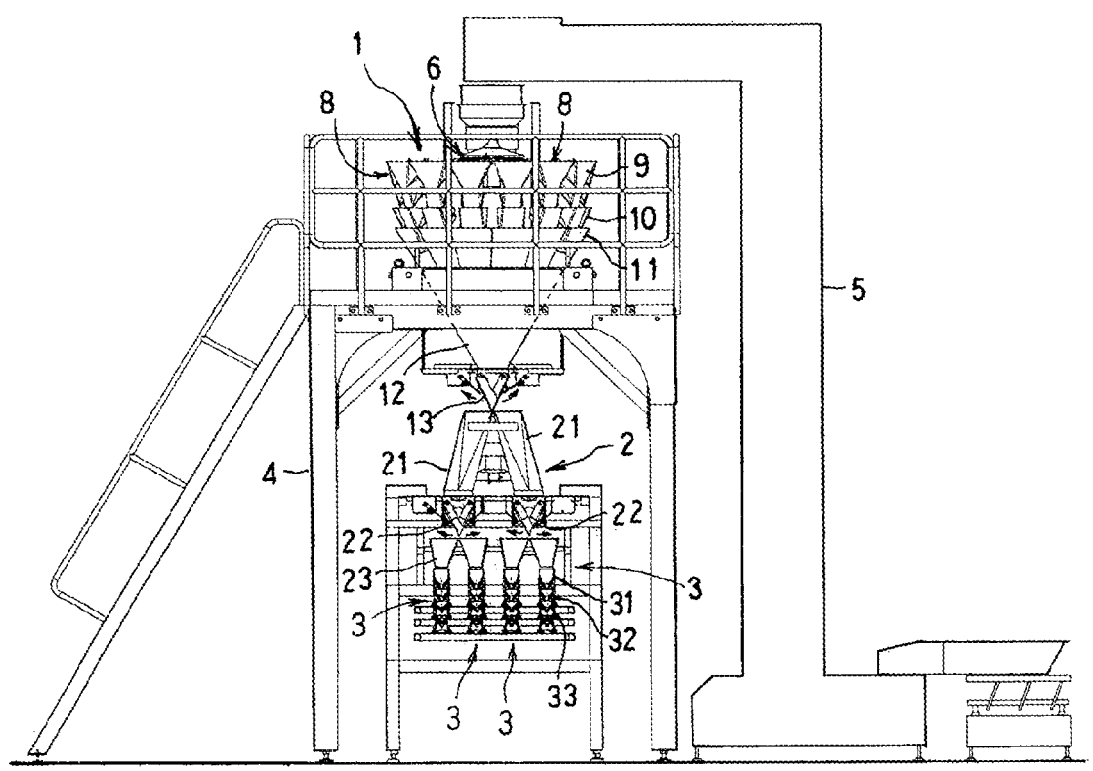
FIG. 2 is a front view of the combination weighing device illustrated in FIG. 1.
Figure 3:
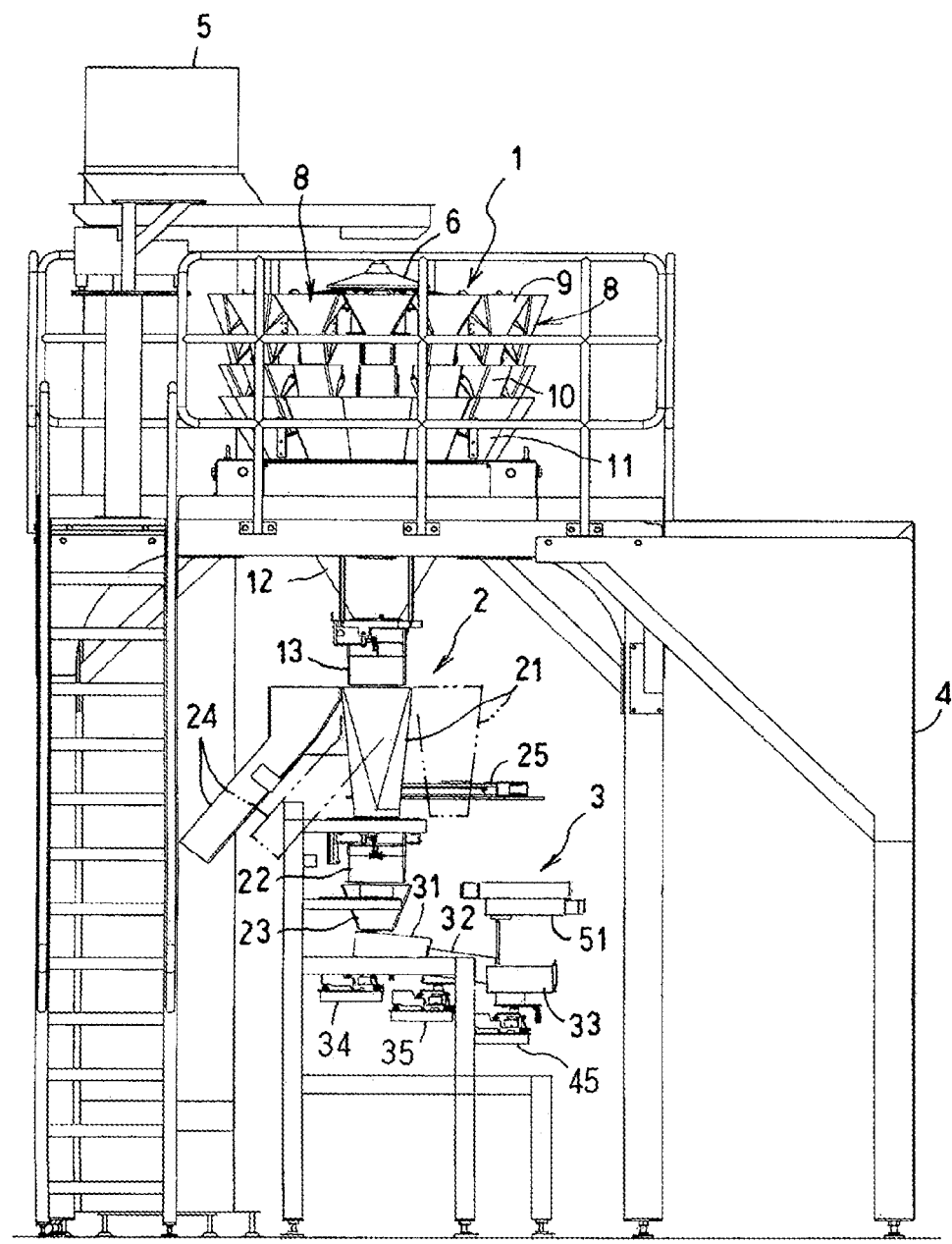
FIG. 3 is a lateral view of the combination weighing device illustrated in FIG. 1.

FIG. 1 is a perspective view of a combination weighing device according to an embodiment of the present invention. FIG. 2 is a front view of the combination weighing device illustrated in FIG. 1. FIG. 3 is a lateral view of the combination weighing device illustrated in FIG. 1.

The combination weighing device according to this embodiment may be suitable for use in weighing and transporting long and thin products that are relatively soft, examples of which may include strips of jerky meat, and strips of cheese codfish cut out from dried sheets made mostly from minced codfish between which slices of cheese are sandwiched.

This combination weighing device includes a combination scale 1 configured to perform a combinatorial weighing process of articles, for example, strips of cheese codfish, a sorting unit 2 configured to sort, into a plurality of target places (four target places in the described example), the articles discharged from the combination scale 1 and having a total weight within a predetermined range of weights, and a plurality of alignment and transport units 3 (four alignment and transport units in the described example) configured to align and vibrationally transport, on a plurality of different paths (four paths in the described example), the articles that have been sorted into the target places by the sorting unit 2.

In the description below, "left-right direction" refers to a direction to and from one and the other lateral sides in FIG. 2 and a direction to and from front and rear sides (facing the drawing) in FIG. 3, and "front-back direction" refers to a direction to and from front and rear sides (facing the drawing) in FIG. 2 and a direction to and from one and the other lateral sides in FIG. 3

The combination scale 1 is installed on a base 4. The base 4 is so built to a height that allows an operator to ascend to and descend from. The sorting unit 2 and the alignment and transport units 3 are installed on a floor underneath the base 4.

The combination scale 1 includes a conical dispersion feeder 6, multiple linear feeders 7 (14 linear feeders in the described example), and multiple weighing units 8 (14 weighing units in the described example). The dispersion feeder 6 vibrationally radially disperses and transports the articles dropped from the center above by an article supply apparatus 5. The linear feeders 7 vibrationally transports the articles dispersed and transported by the dispersion feeder 6 linearly outward. The weighing units 8 are disposed at positions below ends of the linear feeders 7 and are arranged in a circular form in plan view.

The weighing units 8 each include a feeding hopper 9 that receives and temporarily retains the articles from the linear feeder 7, and a weighing hopper 10 that receives the articles discharged from the feeding hopper 9 and weighs the received articles. At positions below the weighing units 8 circularly arranged around the dispersion feeder 6, there are collection chutes 11, a collection funnel 12, and a collection hopper 13. The collection chutes 11 guide the articles discharged from the weighing hoppers 10 to flow downward toward the center of the device. The collection funnel 12 collects the articles dropping the collection chutes 11 into one place. The collection hopper 13 receives and temporarily retains the articles collected by the collection funnel 12. In this embodiment, the feeders 6 and 7, collection chutes 11, collection funnel 12, and hoppers 9, 10 and 13 are, though not illustrated in the drawings, embossed in order to reduce friction against the articles.

The combination scale 1 executes combinatorial computations and accordingly weighs the articles as in the known art. Specifically, the controller (not illustrated in the drawings) of the combination scale 1 executes combinatorial computations to select an optimal combination of the weighing hoppers 10 in which a combined weight obtained by variously combining weights of the articles weighed by the weighing hoppers 10 is equal to a target weight or is included in a predetermined range of weights most approximate to the target weight. Then, the controller prompts the weighing hoppers 10 selected as the optimal combination by the combinatorial computations to discharge the articles. As a result, the articles whose weight is within the predetermined range of weights are temporarily retained in the collection hopper 13.

Figure 4:
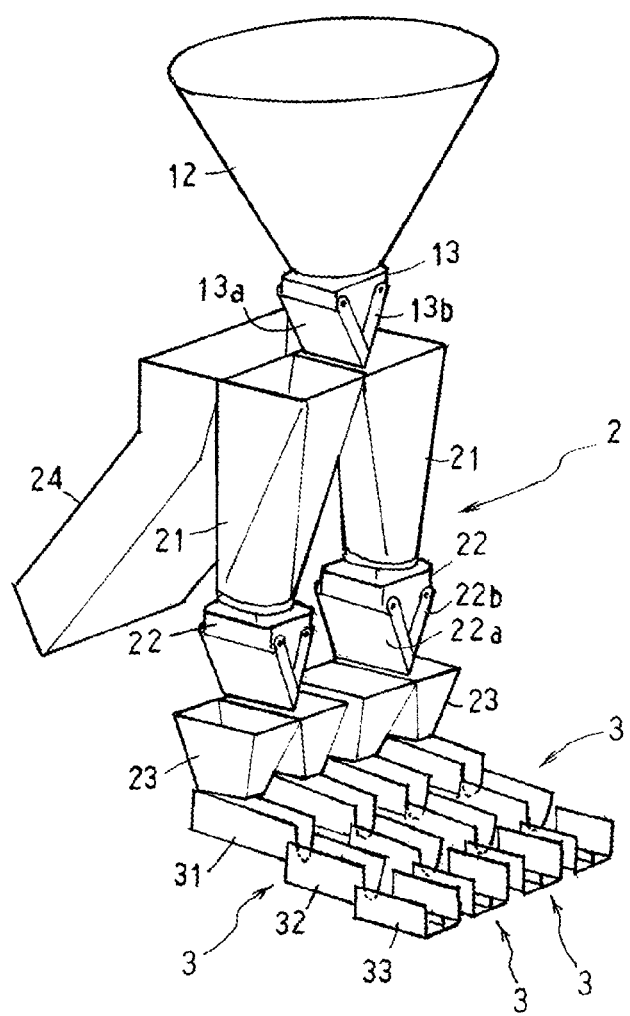
FIG. 4 is a perspective view of a sorting unit and an alignment and transport unit.

As illustrated in FIG. 4, the collection hopper 13 has a pair of left and right gates 13a and 13b that are allowed to open independently in opposite directions. By selectively opening either one of these gates 13a and 13b, the articles temporarily retained and having a weight within the predetermined range of weights are discharged into one of left and right discharge paths.

The sorting unit 2 includes left and right sorting chutes 21, and a pair of sorting hoppers 22. The sorting chutes 21 guide the articles, which are discharged from the collection hopper 13 through either one of the gates and having a weight within the predetermined range of weights, to flow downward into two different places laterally distant from each other. The sorting hoppers 22 receive and temporarily retain the articles guided by the sorting chutes 21.

In a manner similar to the collection hopper 13, the sorting hoppers 22 each have left and right gates 22a and 22b that are allowed to open independently, and the retained articles are discharged into one of left and right discharge paths by selectively opening one of the gates 22a and 22b. Thus, the articles thus discharged from the collection hopper 13 and having a weight within the predetermined range of weights are further sorted by the sorting unit 2 into distribution chutes 23 fixedly disposed at four positions in the left-right direction.

Four alignment and transport units 3 are, correspondingly to the four distribution chutes 23 of the sorting unit 2, disposed in juxtaposition in the left-right direction. These alignment and transport units 3 provide four alignment and transport paths. The alignment and transport units 3 each have three collection troughs 31, 32 and 33 respectively having bottoms curved downward.

Figure 5:
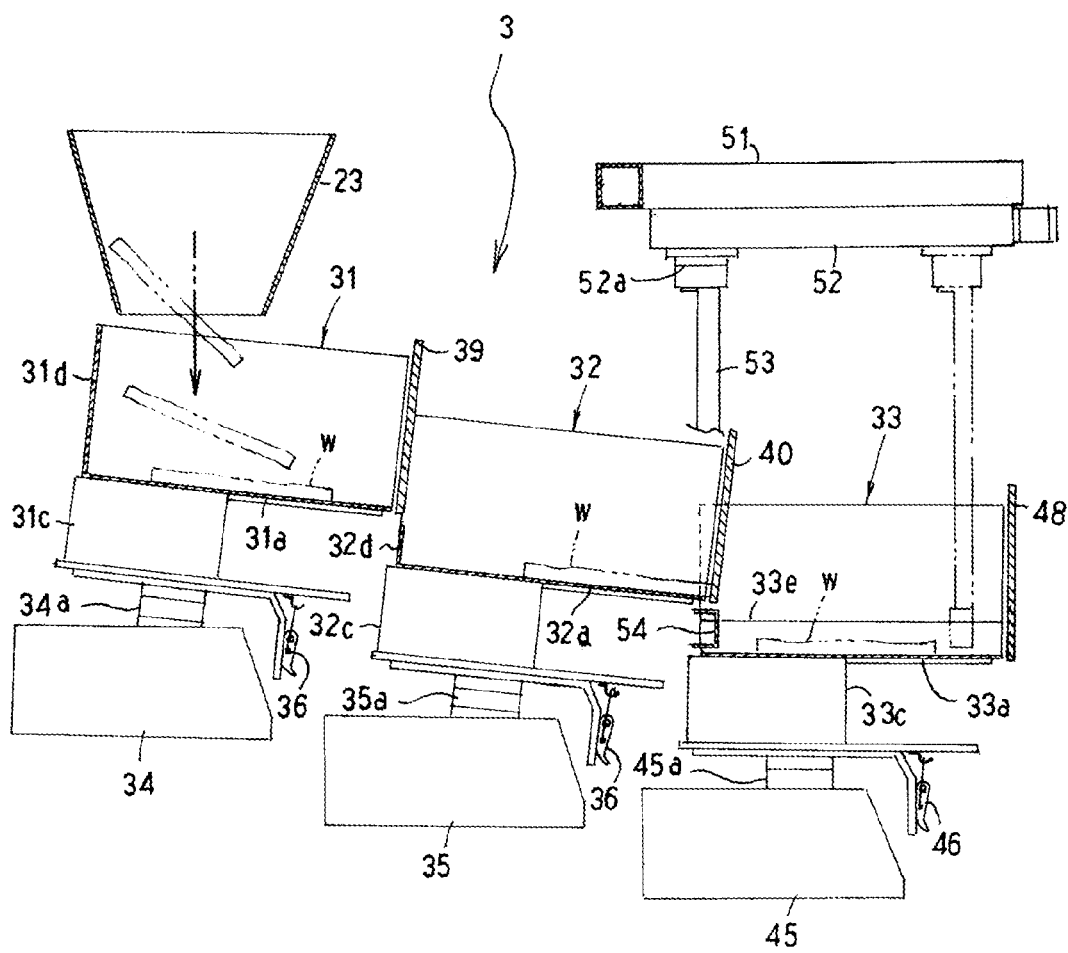
FIG. 5 is a longitudinal sectional lateral view of the alignment and transport unit.

As illustrated in FIG. 5, the three collection troughs 31, 32 and 33 of each alignment and transport unit 3 are longitudinally arranged in tiers reduced in height in a direction of transport of the articles. The collection troughs 31, 32 and 33 are detachably coupled, respectively, to electromagnetic vibration generators 34, 35 and 45 to allow these troughs to be independently vibrated at optional time intervals and vibrational amplitudes.

While the most upstream collection trough 31 and the middle collection trough 32 in the direction of transport are so disposed that their front edges are slightly directed downward, the most downstream collection trough 33 is horizontally situated in the front-back direction.

Figure 6:
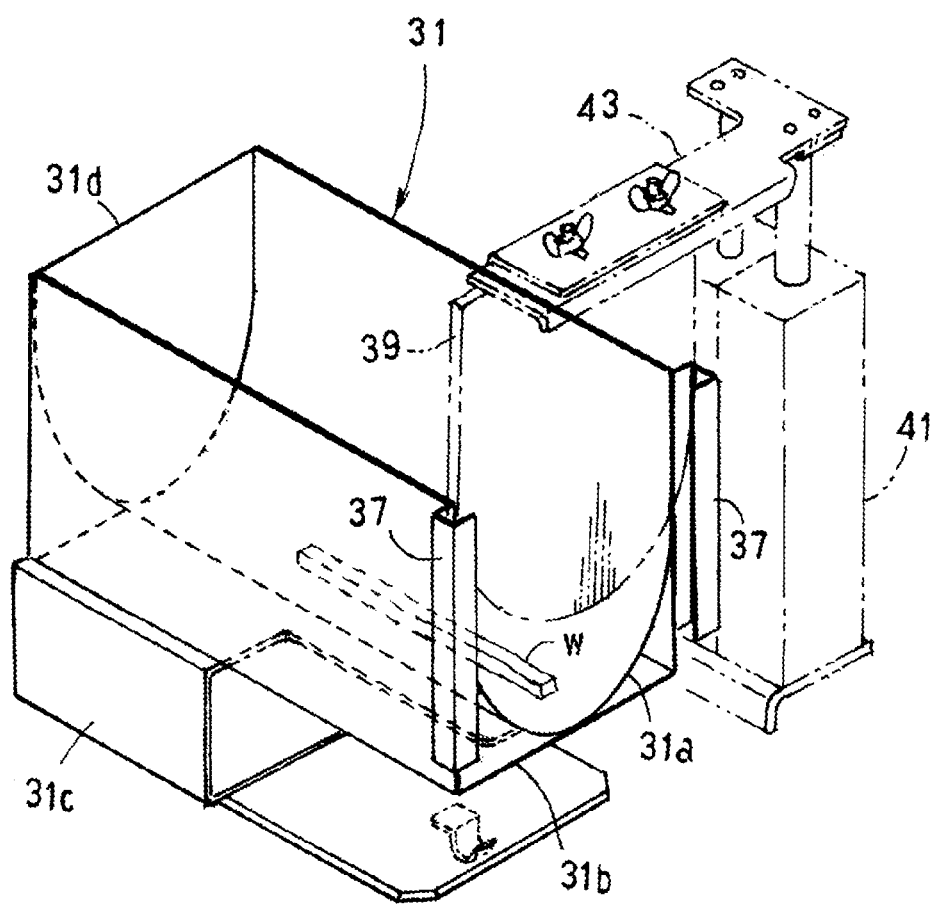
FIG. 6 is a perspective view of an upper collection trough of the alignment and transport unit.
Figure 7:
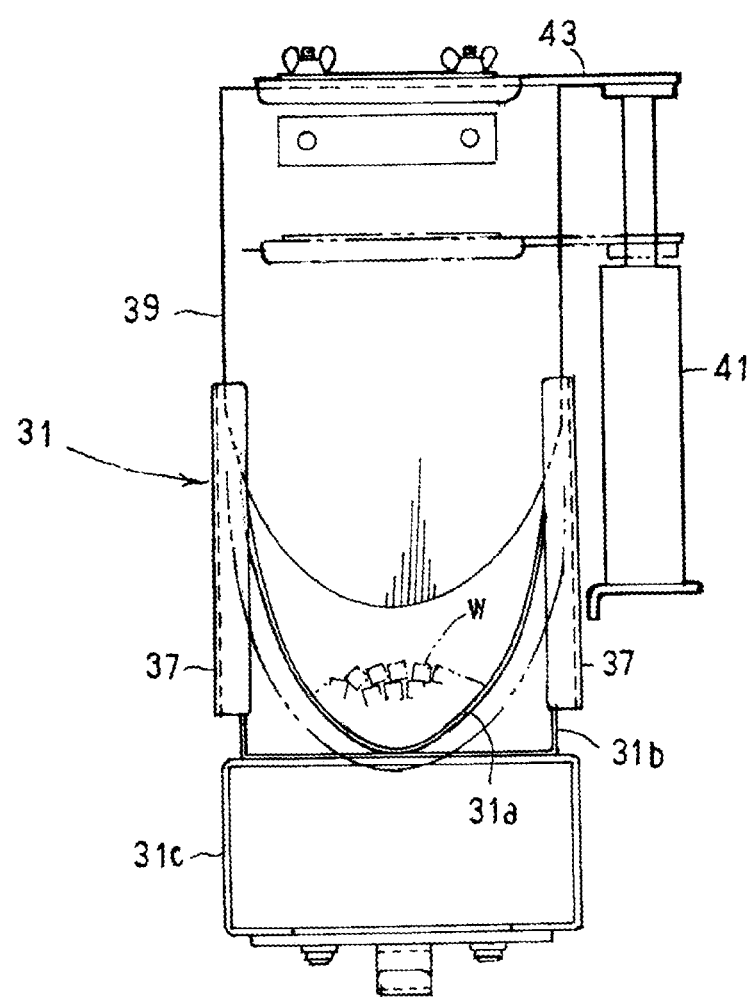
FIG. 7 is a front view of the upper collection trough of the alignment and transport unit.

FIG. 6 is a perspective view of the upper collection trough 31 of the alignment and transport unit 3. FIG. 7 is a front view of the upper collection trough 31. FIG. 8 is a perspective view of the middle collection trough 32 of the alignment and transport unit 3. In FIGS. 6 and 8 is typically shown one article "w" alone.

The collection trough 31, 32 includes a trough body 31a, 32a and a supporting plate 31b, 32b. The trough body 31a, 32a is a member in the form of a U-like shape in cross section with an opening on its upper side and a bottom part dented, curved and tapered downward. The supporting plate 31*a*, 32*b* encloses and thereby strengthens and supports the trough body 31, 32*a*. The supporting plate 31*b*, 32*b* includes a bottom plate and a pair of side plates extending upright from both ends of the bottom plate in a direction of its width. A coupling table 31*c*, 32*c* coupled to the lower surface of the supporting plate 31*b*, 32*b* is positioned at and detachably fitted, with a buckle-like fastener 36, to a vibration head 34*a*, 35*a* of the vibration generator 34, 35 illustrated in FIG. 5. At rear ends of the upper and middle collection troughs 31 and 32 (upstream ends in the direction of transport) are disposed wall plates 31*d* and 32*d* to prevent the articles from falling off the rear ends toward outside.

The collection trough 31, 32 has rails 37, 38 at front-end parts of the collection trough 31, 32 (downstream end in the direction of transport). The rails 37, 38 are formed continuous to the supporting plates 31*b* and 32*b* and are longitudinally disposed and directed inward in the left-right direction toward each other. A shutter 39, 40 for opening and closing the transport path of the collection trough 31, 32 is supported and guided by the rails 37, 38 in a vertically movable manner. The shutter 39, 40 has, in front view, an outer shape that follows the U-like outer shape of the collection trough 31, 32.

The shutters 39 and 40 are respectively coupled to air cylinders 41 and 42 vertically disposed at and fixed to lateral sides of the troughs with stays 43 and 44 interposed therebetween, so that the shutters 39 and 40 are opened and closed when they are moved upward and downward.

The collection troughs 31 and 32 are essentially vibrated at all times, and discharge of the article "w" is controlled by opening and closing the shutters 39 and 40.

Figure 9:
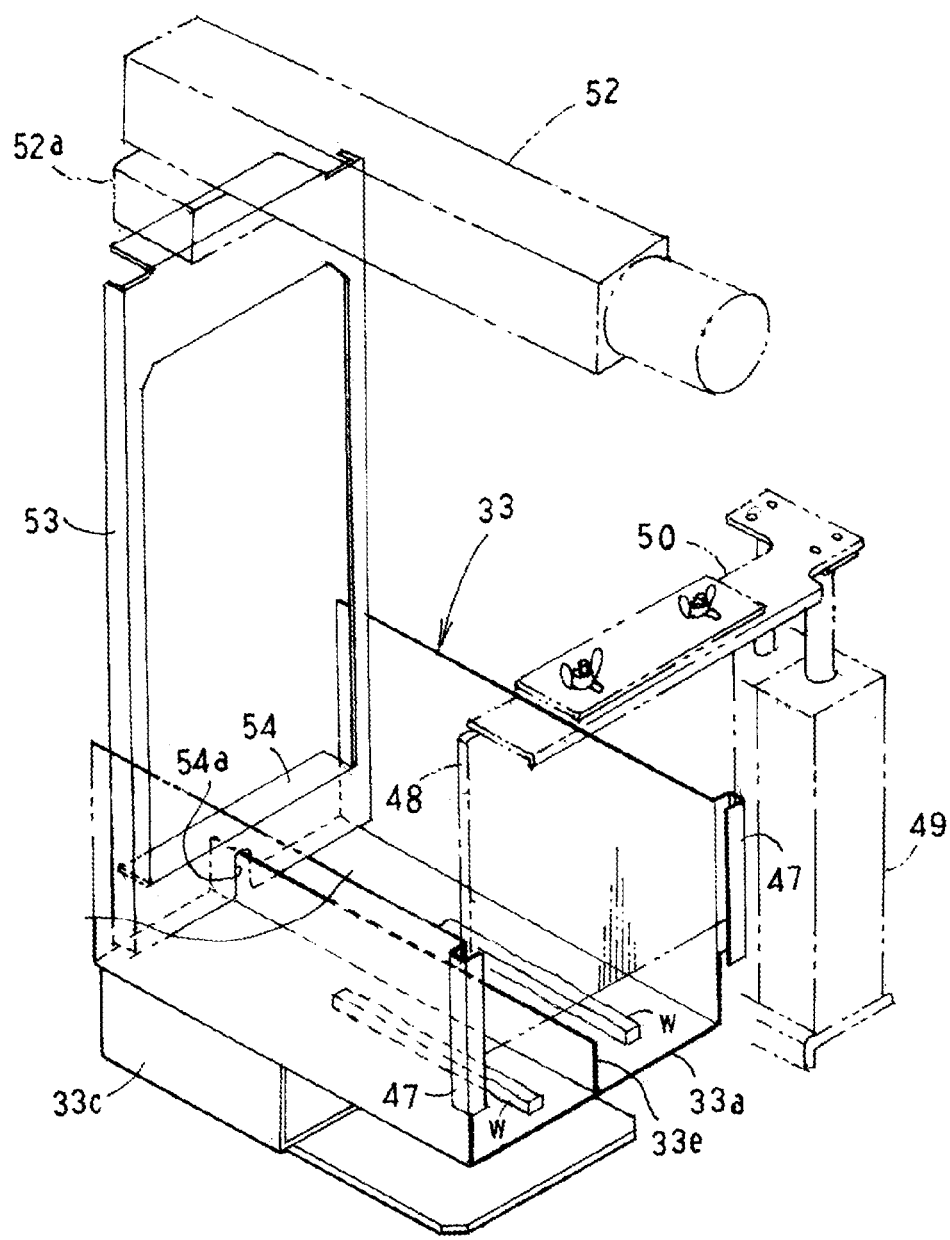
FIG. 9 is a perspective view of a lower collection trough of the alignment and transport unit.
Figure 10:
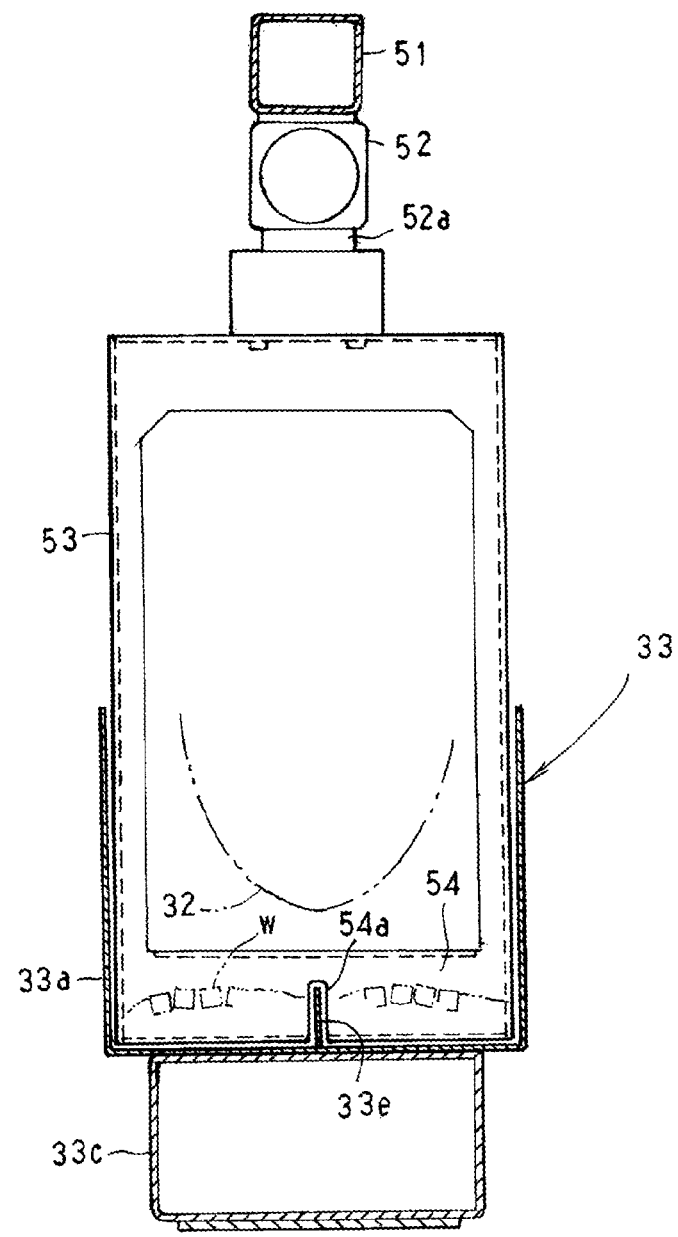
FIG. 10 is a longitudinal sectional front view of the lower collection trough of the alignment and transport unit.
Figure 11:
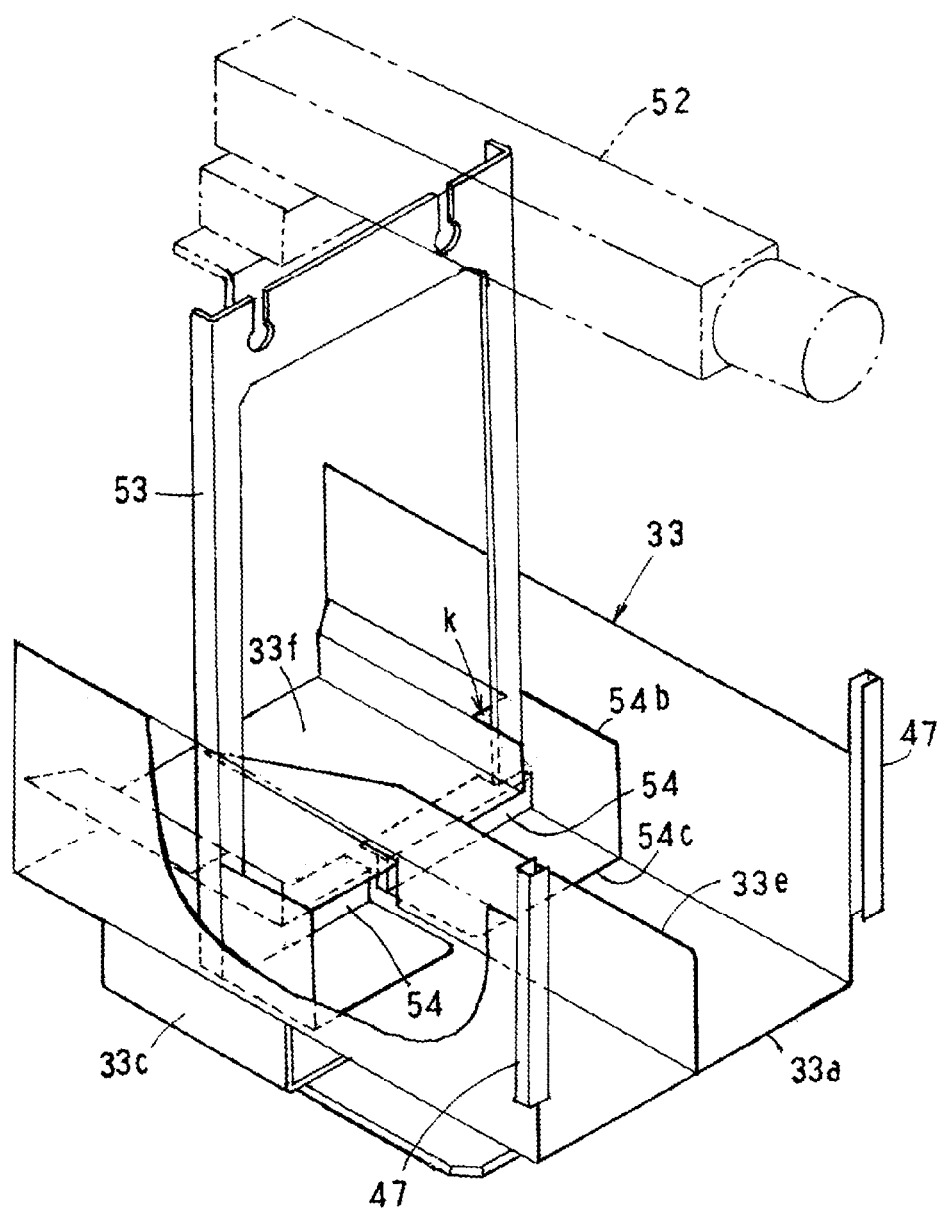
FIG. 11 is a partly-cut perspective view of a lower collection trough according to another embodiment of the present invention.
Figure 12:
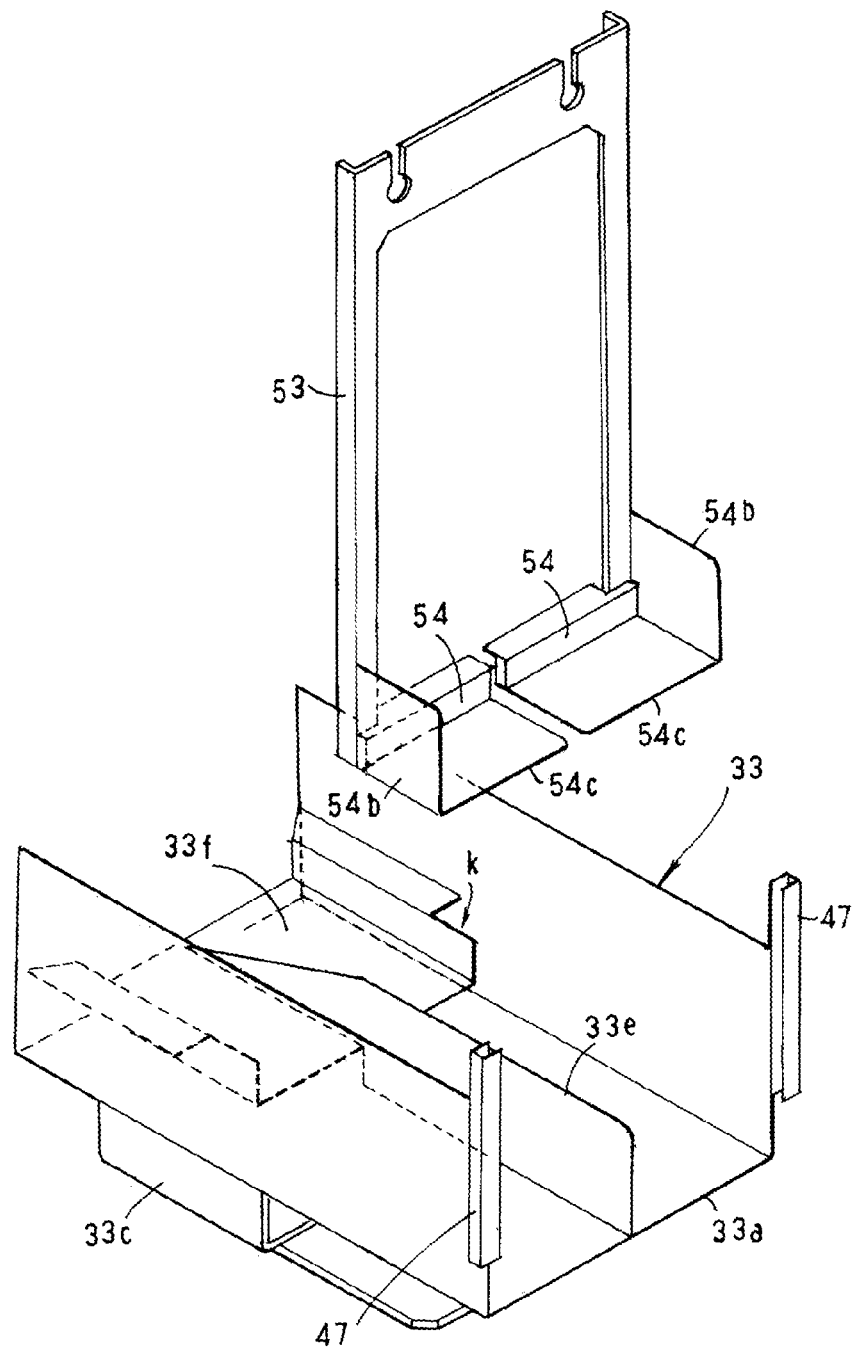
FIG. 12 is an exploded perspective view of the collection trough illustrated in FIG. 11.
Figure 13:
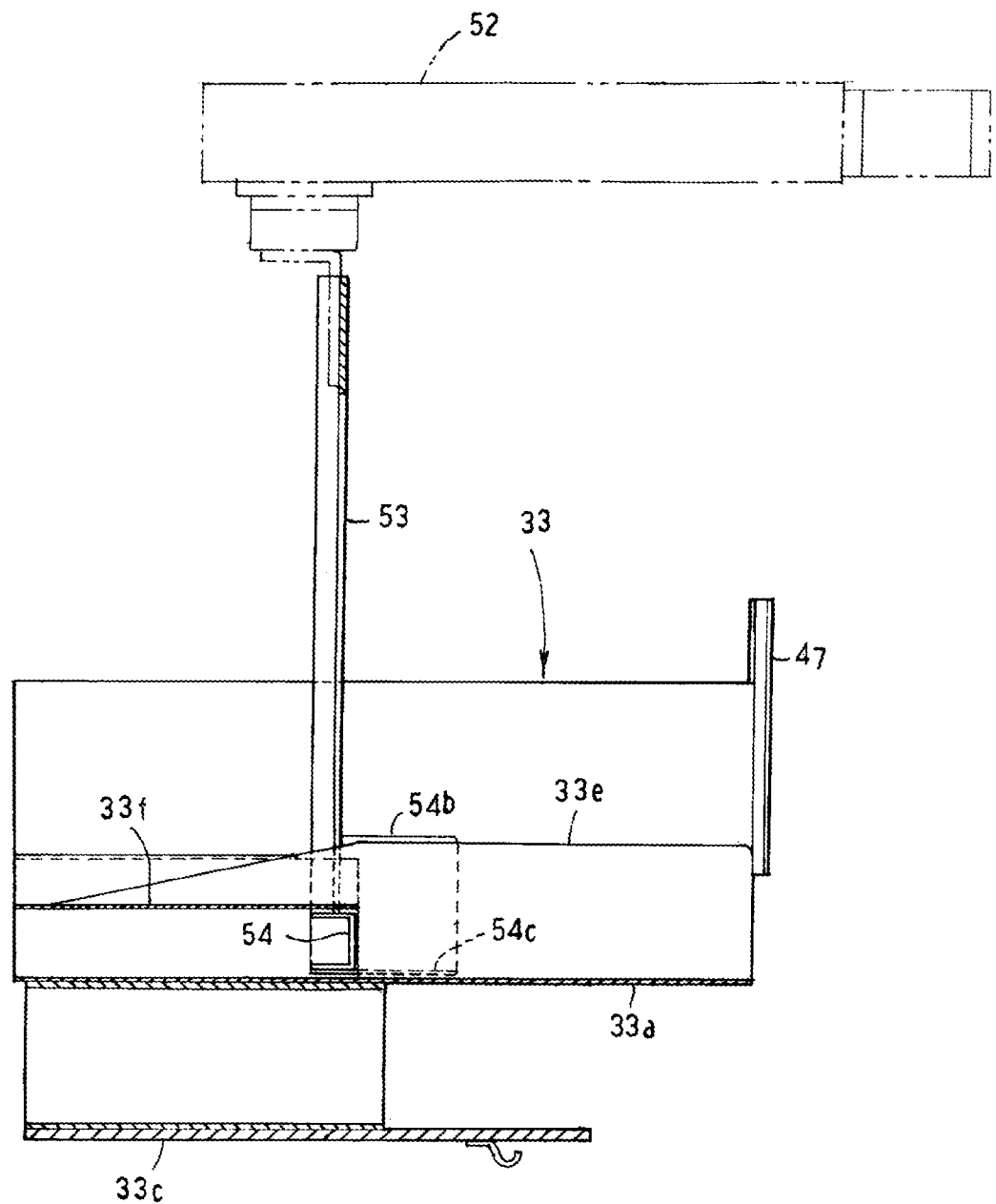
FIG. 13 is a lateral view in longitudinal cross section of the collection trough illustrated in FIG. 11.
Figure 14:
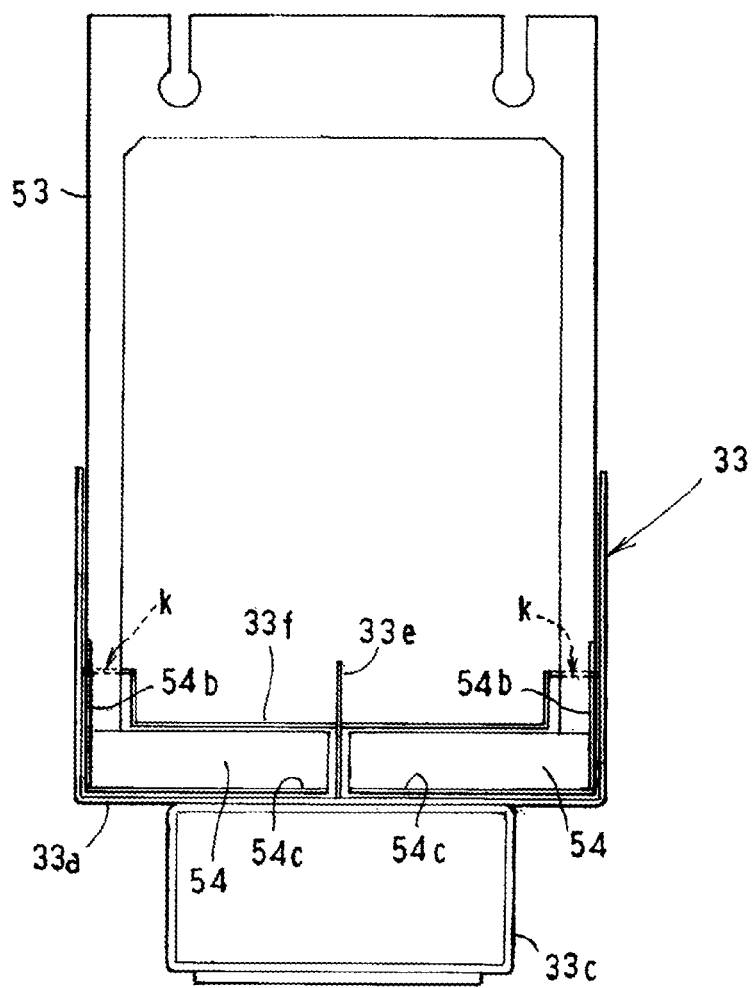
FIG. 14 is a front view of the collection trough illustrated in FIG. 11.

FIG. 9 is a perspective view of the lower collection trough 33 of the alignment and transport unit 3. FIG. 10 is a longitudinal sectional front view of the lower collection trough 33.

The trough body 33*a* of the collection trough 33 includes a flat bottom plate and a pair of side plates extending upright from both ends of the bottom plate in a direction of its width (left-right direction). The trough body 33*a* further has, at a central position of the bottom plate in the left-right direction, a low partition wall 33*e* extending along the direction of transport.

A coupling table 33*c* attached to the lower surface of the trough body 33*a* is positioned at and detachably fitted, with a buckle-like fastener 46, to a vibration head 45*a* of the vibration generator 45 illustrated in FIG. 5.

Rails 47 are longitudinally disposed at front-end parts of the trough body 33*a* (downstream end in the direction of transport). A shutter 48 for opening and closing the transport paths of the collection trough 33 is supported and guided by the rails 47 in a vertically movable manner. The shutter 48 has, in front view, an outer shape that follows the U-like outer shape of the collection trough 33. The shutter 48 is coupled to an air cylinder 49 vertically disposed and fixed to a lateral side of the trough with a stay 50 interposed therebetween. The shutter 48 is accordingly opened and closed through upward and downward movements.

At a position above the lower collection trough 33, an electric slider 52 is horizontally disposed in the front-back direction with the use of a supporting frame 51 fixed in a cantilever manner and extending forward (direction of transport). A pusher 54 is disposed at a lower end of a stay 53 coupled to a sliding portion 52*a* of the electric slider 52 and extending downward. The pusher 54 is allowed to move in the front-back direction along the bottom of the trough body 33*a*. At a middle position in the left-right direction of the pusher 54 is formed a slit 54*a* in which the partition wall 33*e* of the trough body 33*a* is insertable.

The collection trough 33 is essentially vibrated at all times, and the articles "w" are discharged at once when the pusher 54 moves forward in response to the shutter 48 being opened.

In this embodiment, the trough bodies 31*a*, 32*a* and 33*a* of the collection troughs 31, 32 and 33 and the shutters 30, 40 and 48 of the alignment and transport unit 3, and the chutes 21 and 23 and the sorting hoppers 22 of the sorting unit 2 are, though not illustrated in the drawings, embossed in order to reduce friction against the articles.

The combination weighing device according to this embodiment is configured as described thus far. The operation of this combination weighing device is hereinafter described.

Depending on the status of discharge of articles in four alignment and transport units 3 disposed at four positions in the left-right direction, the articles discharged from the collection hopper 13 of the combination scale 1 and having a weight within the predetermined range of weights are sorted and supplied by the sorting unit 2 to the transport starting end of one of the alignment and transport unit 3.

The articles having a weight within the predetermined range of weights that have been discharged into the alignment and transport unit 3 are, first, subject to vibratory motion in the upper collection trough 31. The articles, which are long and thin, are transported forward while they are being vibrationally aligned to have their longitudinal directions coincide with the front-back direction. The articles are then received by the shutter 39 currently closed, which stops the forward movement of the articles, with their tips being lined up with one another.

Then, the shutter 39 is opened to vibrationally transport the articles into the middle collection trough 32. The articles in the middle collection trough 32 are subject to vibratory motion again and thereby aligned and transported forward. The articles are then received by the shutter 40 currently closed, which stops the forward movement of the articles, with their tips being lined up with one another.

Then, the shutter 40 is opened to vibrationally transport the articles into the lower collection trough 32. The articles in the lower collection trough 33 are further subject to vibratory motion and thereby aligned and transported forward. The articles are then received by the shutter 47 currently closed, which stops the forward movement of the articles. In the lower collection trough 33, the partition wall 33*e* may serve to prevent that the articles currently upright possibly fall sideways, and the articles may keep their longitudinal directions to coincide with the front-back direction.

Then, the shutter 48 is opened, and the pusher 54 on standby at the transport starting end of the collection trough 33 starts to move forward. As a result, the articles are pushed at once by the pusher 54 out of the lower collection trough 33 without losing their aligned state.

A transport tool, which is supported by, for example, a robot arm, may be ready on standby at a position to which the articles in the lower collection trough 33 are discharged. The articles discharged from the collection trough 33 are received in the aligned state by this transport tool. The articles received by this transport tool are then carried to a designated packaging line, wrapped in, for example, a shallow box-shaped package, and then sealed in a subsequent packaging step.

In this embodiment, the sorting chutes 21 of the sorting unit 2 are driven to move forward and backward by the electric slider 25, and a reject chute 24 is coupled to rear parts of the sorting chutes 21, as illustrated in FIG. 3. In case the weighing hopper 10 is oversupplied with the articles in an amount beyond a range of selectable optimal combinations, the oversupplied articles are discharged from the weighing hopper 10 into the collection hopper 13. As illustrated with a virtual line in FIG. 3, the sorting chutes 21 and the reject chute 24 are moved forward together, so that the reject chute 24 face the collection hopper 13 of the combination scale 1. The oversupplied articles are then discharged from the collection hopper 13 into the reject chute 24 and collected through the reject chute 24 into a container prepared to collect the articles.

In this embodiment, the articles discharged from the collection hopper 13, while being vibrationally transported, may be aligned in stages by the collection troughs 31, 32 and 33 of the alignment and transport unit 3, and tips of the articles may be adjusted to line up with one another by the shutters 39, 40 and 48 of the collection troughs 31, 32 and 33. Thus, the articles finally transported out of the collection trough 33 may be favorably aligned in the same direction, with their tips being lined up with one another.

Another Embodiment

The present invention may be feasible in the following manner.

1) For example, the lower collection trough 33 may be configured as illustrated in FIGS. 11 to 14. In another embodiment of the present invention, the lower collection trough 33 has a front-half bottom plate 33f. The front-half bottom plate 33f is formed in a front-half part of the trough body 33a with a pair of side plates extending upright from both ends of the bottom plate in the direction of its width (left-right direction). This front-half bottom plate 33f has a transport path higher than the bottom surface of a rear-half part of the trough 33 and narrower than the lateral width of the rear-half part. The lower collection trough 33 further has, in its laterally central part, a partition wall 33e. The partition wall 33e is vertically disposed and extending from the front-half bottom plate 33f to the bottom surface of the rear-half part. A front end of the partition wall 33e is higher than the front-half bottom plate 33f, and an upper end side of the partition wall 33e in the front-half bottom plate 33f is progressively increased in height in the direction of transport. With these structural features, the articles that have been transported to the transport path of the front-half bottom plate 33f may be smoothly sorted and guided to the left and right sides by the progressively higher, upper end side of the partition wall 33e and vibrationally transported rearward.

The pusher 54 is divided at a position lower than the front-half bottom plate 33f in two portions on the left and right sides of the partition wall 33e. These two pusher portions 54 are coupled to and supported by left and right lower ends of the stay 53 driven to move forward and backward by the electric slider 52. The left and right pusher portions 54 each have a side plate 54b formed along the side plate of the trough body 33a, and a bottom plate 54c formed along the bottom surface of the trough body 33a. As the pusher 54 thus structured moves forward, the articles in the rear half of the trough may be successfully picked up, pushed out and discharged by this pusher.

Notches "k" are formed at rear-end positions on the left and right sides of the front-half bottom plate 33f. The stay 53 moving backward is invited into these notches, so that the pusher 54 pulled backward is ready on standby underneath a rear-end part of the front-half bottom plate 33f.

2) Of the collection troughs of the alignment and transport unit 3, the upper collection trough 31 alone may be formed in a U-like shape in cross section. The middle collection trough 32, as well as the lower collection trough 33, may have a pair of side plates extending upright from both ends of the bottom plate in the direction its width, and a partition wall disposed at a laterally center part of the bottom plate.

3) All of the three collection troughs 31, 32 and 33 of the alignment and transport unit 3 may be formed in a U-like shape in cross section.

4) Of the collection troughs of the alignment and transport unit 3, at least the upper collection trough 31 may have, in longitudinal section, a dented and curved shape with an opening increasingly widened upward, like "V".

5) The sorting chutes 21 of the sorting unit 2 may each have, at a lower end thereof, a simply structured gate to allow the articles to be sorted and discharged through the opened gate into two places, and two alignment and transport units 3 may be provided that vibrationally transport the articles sorted and discharged by the sorting unit 2.

6) The sorting unit 2 may be unnecessary unless high-speed processes are required. In this instance, the articles discharged from the combination scale 1 may be supplied to one alignment and transport unit 3.

7) The alignment and transport unit 3 may have, instead of three collection troughs as described herein, less than three collection troughs or four or more collection troughs.

8) While the weighing units 8 each include the feeding hopper 9 and the weighing hopper 10 in the earlier embodiment, the weighing units 8 may include other hoppers, for example, memory hoppers that retain the articles weighed by and discharged from the weighing hopper 10. In this instance, the weighing hoppers 10 and the memory hoppers may be target hoppers to be combined and selected in the combinatorial computations, and the memory hoppers may be selectable in optimal combinations.

9) The present invention may be suitable for use in weighing and transporting long and thin products that are relatively soft like strips of cheese codfish, however, may also be useful in weighing and transporting long and thin products that are relatively hard like breadstick.

REFERENCE SIGNS LIST 1 combination scale
2 sorting unit
3 alignment and transport unit
8 weighing unit
13 collection hopper
21 sorting chute
22 sorting hopper
24 reject chute
31 collection trough
32 collection trough
33 collection trough
39 shutter
40 shutter
48 shutter
54 pusher

The invention claimed is:

1. A combination weighing device, comprising:
a plurality of weighing units arranged in a circular form;
a combination scale configured to temporarily retain, in a collection hopper, articles discharged from one or more of the plurality of weighing units selected as a result of combinatorial computations and to discharge the articles from the collection hopper; and
an alignment and transport unit configured to align and vibrationally transport the articles discharged from the collection hopper,
wherein
the alignment and transport unit comprises:
a collection trough that receives the articles discharged from the collection hopper; and
a vibration generator configured to vibrate the collection trough and to vibrationally transport the articles in a longitudinal direction of the collection trough, and
the collection trough has a bottom part formed in a dented and curved shape.

2. The combination weighing device according to claim 1, wherein
the collection trough has a U-like shape in cross section.

3. The combination weighing device according to claim 1, wherein
the alignment and transport unit comprises:
a plurality of the collection troughs disposed along a direction of transport of the articles; and
a plurality of shutters disposed at ends of the plurality of the collection troughs in the direction of transport and allowed to open and close transport paths of the plurality of the collection troughs.

4. The combination weighing device according to claim 3, wherein
the alignment and transport unit comprises a pusher used to push and discharge the articles out of a most downstream one of the plurality of the collection troughs in the direction of transport.

5. The combination weighing device according to claim 1, further comprising:
a sorting unit disposed between the combination scale and the alignment and transport unit, the sorting unit being configured to sort the articles discharged from the collection hopper of the combination scale into a plurality of target places; and
a plurality of the alignment and transport units disposed correspondingly to the plurality of target places that receive the articles sorted and discharged by the sorting unit.

6. The combination weighing device according to claim 5, wherein
the collection hopper of the combination scale is allowed to selectively discharge the articles to two different discharge paths,
the sorting unit comprises:
two sorting chutes that respectively guide the articles on the two different discharge paths to flow downward; and
two sorting hoppers allowed to temporarily retain the articles guided by the sorting chutes and to selectively discharge the articles to two different discharge paths, and
the plurality of the alignment and transport units independently operate correspondingly to the two different discharge paths of the two sorting hoppers.

* * * * *